United States Patent [19]
Gorin

[11] 3,775,621
[45] Nov. 27, 1973

[54] GAS REACTION APPARATUS

[75] Inventor: Georges J. Gorin, Berkeley, Calif.

[73] Assignee: LFE Corporation, Waltham, Mass.

[22] Filed: Dec. 29, 1972

[21] Appl. No.: 319,872

[52] U.S. Cl.................. 250/531, 204/164, 204/193
[51] Int. Cl.............................................. B01k 1/00
[58] Field of Search........................... 204/164, 193; 250/531

[56] References Cited
UNITED STATES PATENTS

| | | | |
|---|---|---|---|
| 2,086,434 | 7/1937 | Rankin................................ | 250/531 |
| 3,247,014 | 4/1966 | Goldberger et al................. | 204/164 |
| 3,305,466 | 2/1967 | McCoy................................ | 204/164 |
| 3,410,776 | 11/1968 | Bersin................................ | 204/193 |
| 3,616,461 | 10/1971 | Gorin................................. | 204/193 |
| 3,619,403 | 11/1971 | Gorin................................. | 250/531 |

*Primary Examiner*—T. Tufariello
*Attorney*—Richard J. Donahue

[57] ABSTRACT

Apparatus for inducing an efficient reaction between a gaseous plasma and a nongaseous material at relatively low ambient temperatures. The reaction vessel includes means for supporting a sample dish or boat containing the material and for enabling the agitation of the boat so as to enhance the rate and completeness of the decomposition of the material into its inorganic constituents.

5 Claims, 1 Drawing Figure

PATENTED NOV 27 1973
3,775,621
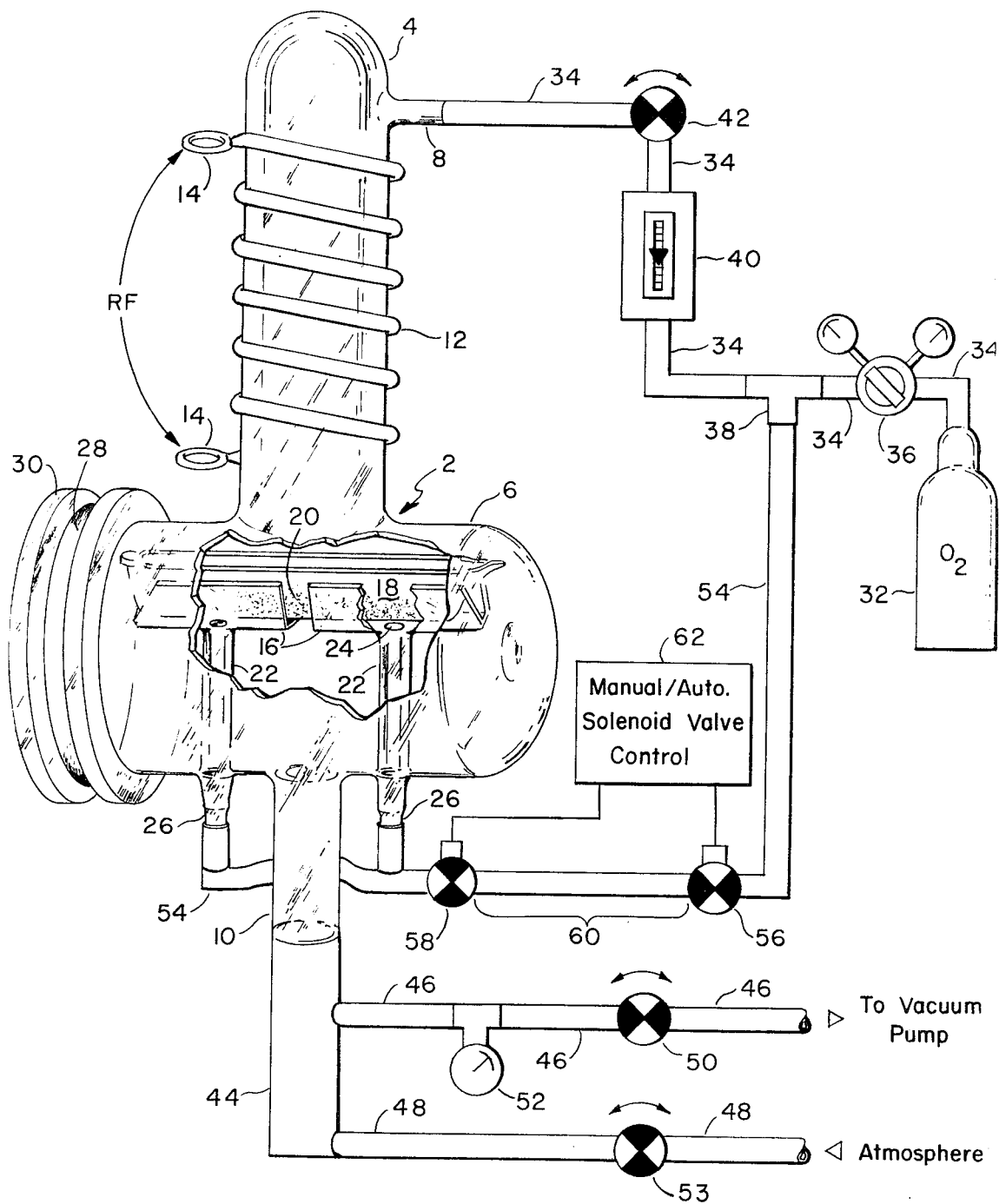

GAS REACTION APPARATUS

FIELD OF THE INVENTION

This invention relates to apparatus for imparting energy to a gas and reacting it with a nongaseous material, and more particularly it concerns an improved form of such apparatus wherein the material may be agitated during the reaction process.

BACKGROUND OF THE INVENTION

The decomposition of nongaseous materials in a controlled environment is an important procedure in the field of spectrochemical analysis. It is often necessary, for example, to separate and recover for subsequent analysis trace quantities of inorganic material present in food, biological, and pharmaceutical samples. In order to achieve an accurate analysis, both quantitatively and qualitatively, the procedure must be performed without the introduction of contaminant substances or the inadvertent loss, partially or completely, of the sought-after constituents.

In U.S. Pat. No. 3,410,776 entitled "Gas Reaction Apparatus," there is disclosed a system for reacting a nongaseous material with an activated gas at low temperatures to decompose the material into its elemental constituents. Basically, the above-mentioned system includes a reaction vessel having a first chamber into which a stream of gas is introduced and activated by RF energy, and a second chamber therebelow which accepts a sample boat containing material to be decomposed by the activated stream, or plasma. The resultant gaseous byproducts of the reaction, together with any unreacted species of the gas, are withdrawn from the second chamber through an outlet coupled to an exhaust pump.

Systems of the general type described above have proven to be valuable scientific instruments and have achieved widespread commercial acceptance. It has been observed, however, that the efficiency of such systems could be substantially improved if means were available to occasionally or periodically agitate the sample boat so as to disrupt the layer of inorganic residue formed on the surface of the sample during the reaction process, and thereby expose fresh underlying particles of organic material to the plasma environment. Such an agitation means, however, must not introduce contaminant substances into the reaction vessel or adversely affect the formation or flow of the activated gas therein.

SUMMARY OF THE INVENTION

It is therefore an object of the present invention to provide a gas reaction apparatus of improved performance and efficiency.

A further object of the present invention is to provide a gas reaction system wherein material subjected to the reaction process may be agitated to enhance the reaction process.

The foregoing and other objects are accomplished by providing a reaction vessel having a pair of platforms therein which support a sample dish or boat of material to be reacted. Each platform is affixed to the top of a hollow tubular column and has a hole therethrough above the opening in the column. The columns extend through the wall of the reaction vessel and form gas injection ports through which a controlled impulse of pressurized gas is applied against the bottom of the sample boat to momentarily lift the boat from its platform supports. The gas is of the same type as that which is continuously introduced into the reaction vessel above the sample boat and activated by RF energy. A pair of electrically-operated valves are inserted in the line which feeds the injection ports, for the purpose of controlling the quantity of gas injected into the reaction vessel at any given time. The valves may be manually actuated by means of a pushbutton switch or may be automatically activated at preset intervals by means of an associated timing device.

DESCRIPTION OF PREFERRED EMBODIMENT

Other objects, features, and advantages will occur from the following description of the preferred embodiment of the invention when taken in conjunction with the accompanying drawing in which:

The FIGURE is an illustration in diagrammatic form of a gas reaction apparatus constructed in accordance with the principles of the present invention.

With reference now to the drawing, it will be seen that the numeral 2 designates generally a reaction vessel having a first chamber 4 into which a gas is introduced and activated, and a second chamber 6 therebelow which receives a sample of the material to be reacted with the gas. Gas is introduced into the first chamber 4 via the inlet 8 and is withdrawn from the second chamber 6 via the outlet 10. Energy is electromagnetically imparted to the gas by means of a multi-turn coil 12, whose terminals 14 are coupled to a source of RF energy (not shown). The amount of power supplied by the RF source is preferably in the order of a few hundred watts at a frequency approximating 13 megahertz.

A portion of the second chamber 6 of the reaction vessel 2 has been broken away in the drawing in order to better illustrate the substantially U-shaped platforms 16 which support a sample boat 18 containing the material 20 to be subjected to the activated gas. Each of the platforms 16 is fused to a hollow tubular column 22 and has a hole 24 therethrough immediately above the opening in the column 22. A side of one of the platforms 16 has been broken away in the drawing in order to better illustrate this detail. The lower ends of the columns 22 extend through the wall of the chamber 6 and terminate in a pair of gas injection inlets 26 whose function will be described in detail below. The reaction vessel 2 has a flanged opening at one end thereof for inserting and removing the sample boat. The opening is provided with a sealing gasket 28 and a closure in the form of a cap-like cover 30 which is fitted tightly over the opening after the sample boat has been inserted into the vessel. The reaction vessel 2, the cover 30, and the sample boat 18 are preferably made of a glass or quartz material.

A container 32 of a molecular gas, such as oxygen, is coupled to the inlet 8 of the reaction vessel by way of a feed-line 34. Inserted in the feedline 34 downstream from the gas container 32 there is a pressure regulator valve 36, a T-connector 38, a flowmeter 40, and a needle valve 42. The pressure regulator valve 36 may be provided as an integral part of the container 32 by commercial suppliers of molecular gases. The flowmeter 40 continuously monitors the flow rate of the gas through feedline 34 which is controlled by the setting of the needle valve 42.

Outlet 10 of the reaction vessel 2 is coupled to a connector 44 having a pair of lines 46 and 48 emanating therefrom. Line 46 is connected to a vacuum pump (not shown) by way of a control valve 50. A vacuum gauge 52 is inserted in the line 46 which continuously monitors the pressure within the reaction vessel. Line 48 is coupled to the atmosphere by way of a bleed valve 53. A gas injection line 54 branches out of feedline 34 at the T-connector 38 and is coupled to each of the gas injection ports 26 through a cascaded pair of solenoid valves 56 and 58. The solenoid valves 56 (normally open) and 58 (normally closed) are joined together by the section 60 of line 54. A control unit 62 provides the electrical energy required to cause valve 56 to close and valve 58 to open. Control unit 62 may consist of a manually operated pushbutton switch or an electrical timing device, or both.

In operation, a sample boat 18 containing material 20 is placed on its pedestal supports 16 and the reaction vessel 2 is closed by the cover 30. The system is then pumped down to withdraw air and residual gases from the vessel by way of the outlet 10. The rate and degree of pump-down is controlled by adjusting valve 50 and the pressure established within the vessel is displayed by vacuum gauge 52. Bleed valve 53 is closed at this time and is opened at the completion of the reaction process when it is desired to slowly return the reaction vessel to atmospheric pressure.

After a desired pump-down has been obtained, pressure regulator valve 36 is adjusted to provide the required gas pressure in the feedline 34. Needle valve 42 is then adjusted to obtain the necessary flow rate of gas through feedline 34, as indicated by flowmeter 40. RF energy is then applied to the multiturn coil 14. This energy is imparted to the gas so as to create a gaseous plasma capable of entering into reactions with the organic constituents of the material 20. The volatile by-products produced by the reaction, as well as unreacted species of the gas, are continuously removed from the reaction vessel by the action of the exhaust pump.

During the reaction process a layer of inorganic residue is formed on the surface of the sample material 20. The solenoid valve control unit 62 is either manually or automatically enabled so as to close valve 56 and open valve 58 whereby the gas trapped in line section 60 therebetween is released and injected into the reaction vessel at the base of the sample boat. The impulse of pressurized gas causes the sample boat to be jolted from its pedestal supports 16 and fall back thereto. This agitation of the boat disrupts the surface layer of inorganic residue and exposes fresh underlying particles of organic material to the plasma environment, thus enhancing the reaction process.

Although the invention has been described with reference to a preferred embodiment, it will be apparent, of course, that many modifications may be made which are within the scope contemplated by the invention. Consequently, the invention herein described is to be construed to be limited only by the spirit and the scope of the appended claims.

What is claimed is:

1. Apparatus for inducing a reaction between a gas and a nongaseous material comprising;
    a source of gas,
    a reaction vessel,
    means for passing a stream of said gas through said reaction vessel,
    means for activating the stream of gas as it passes through said reaction vessel,
    a material-handling container,
    means for supporting said container in said reaction vessel, and
    means for injecting impulses of said gas into said reaction vessel below said container to agitate said container.

2. Apparatus as defined in claim 1 wherein said supporting means includes a pair of U-shaped platforms, each of said platforms having a port for coupling gas therethrough.

3. Apparatus as defined in claim 2 wherein said means for injecting impulses of gas into said reaction vessel includes a pair of gas inlets, each formed at one end of a pair of tubular columns, each of said columns extending through the wall of said reaction vessel to the port in one of said platforms.

4. Apparatus as defined in claim 3 wherein said means for injecting impulses of gas into said reaction vessel further includes:
    a first solenoid valve coupled between said source of gas and a gas line, said first solenoid valve being normally open,
    a second solenoid valve coupled between said gas line and each of said pair of gas inlets, said second solenoid valve being normally closed, and
    control means for electrically closing said first valve and opening said second valve whereby the gas trapped therebetween is released into said reaction vessel.

5. Apparatus as defined in claim 4 wherein said control means comprises a timing device.

* * * * *